Oct. 12, 1965   E. R. LADY   3,210,950
SEPARATION OF GASEOUS MIXTURES
Filed Sept. 26, 1960   3 Sheets-Sheet 1

INVENTOR
EDWARD R. LADY

BY

SHANLEY and O'NEIL
ATTORNEYS

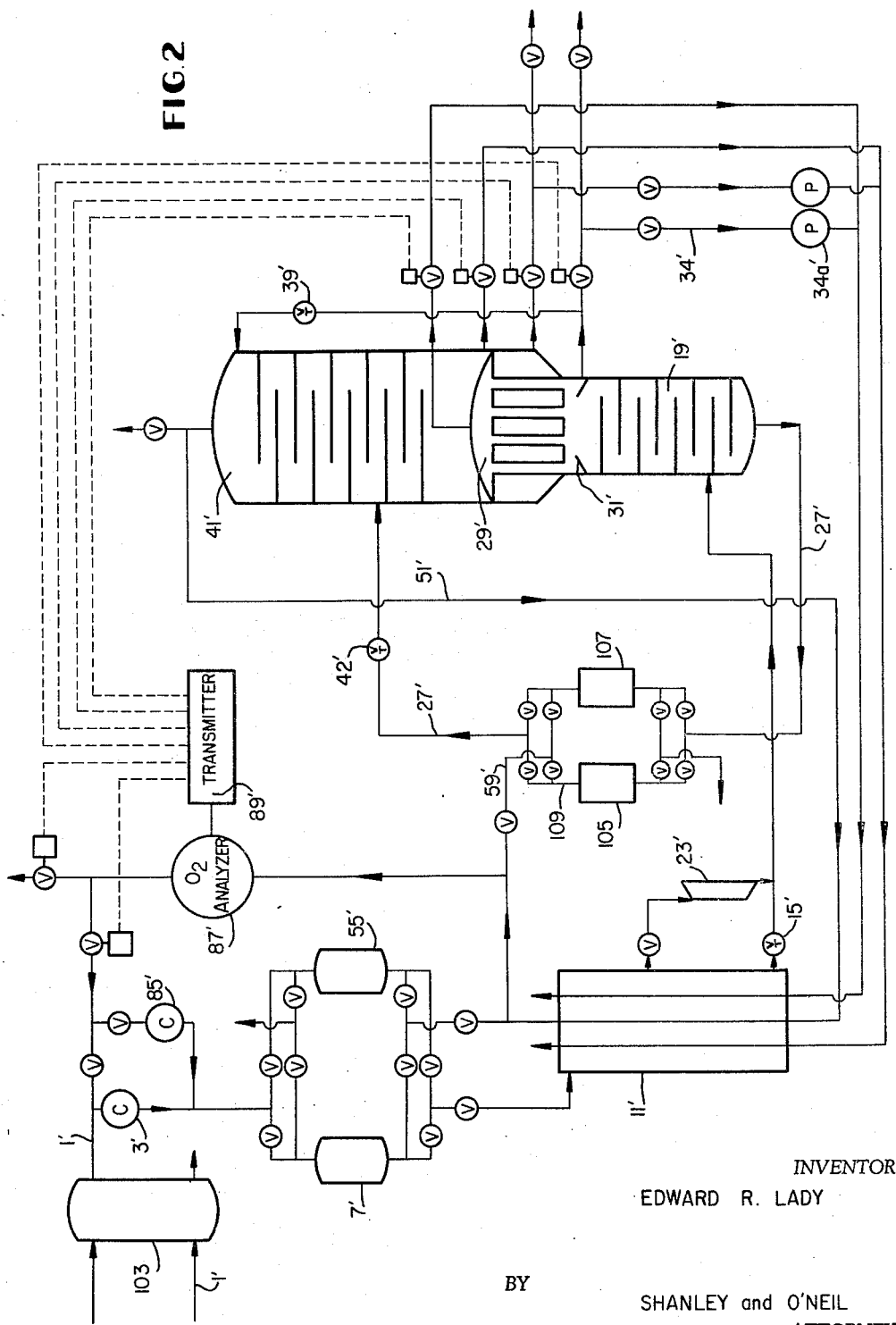

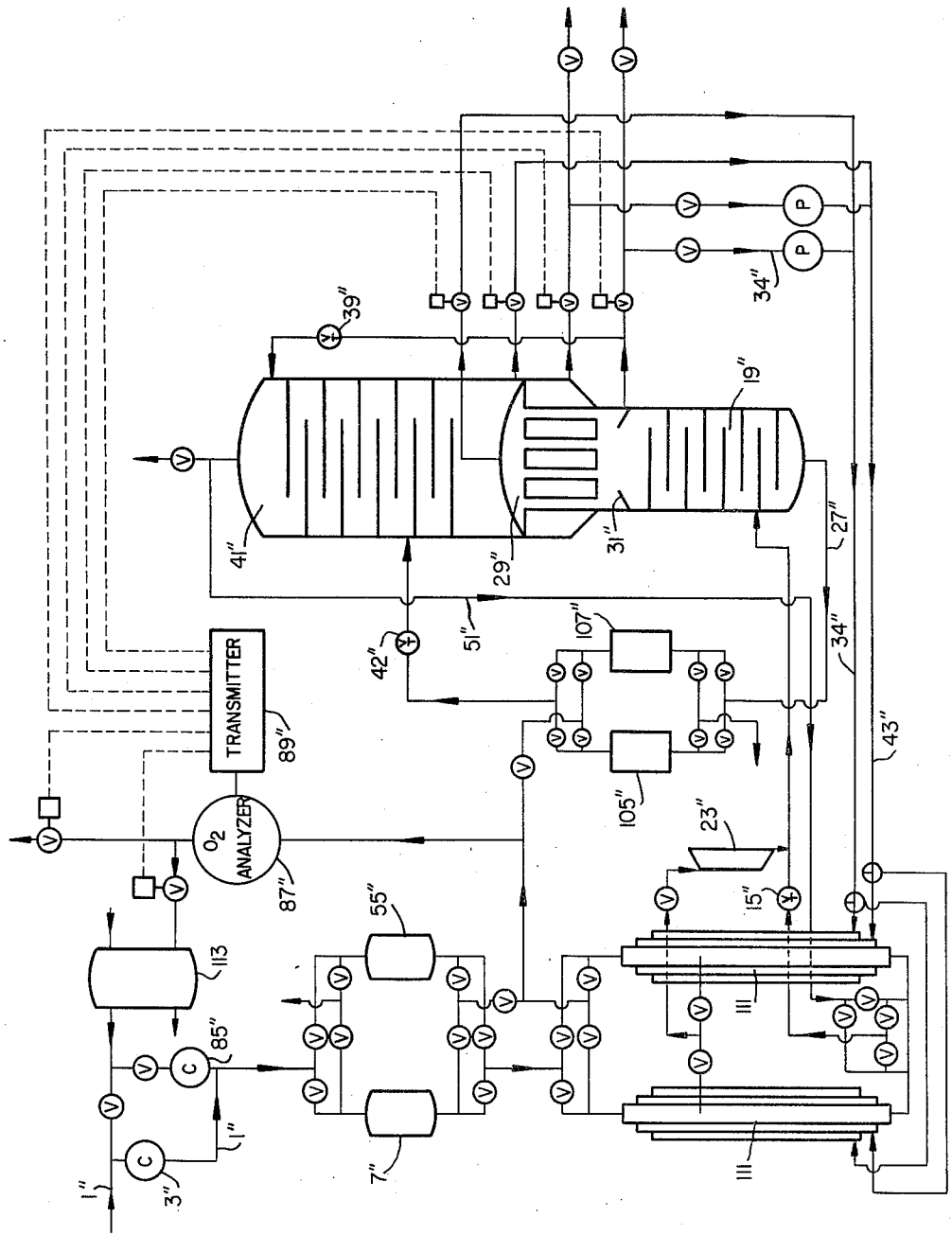

United States Patent Office 3,210,950
Patented Oct. 12, 1965

3,210,950
SEPARATION OF GASEOUS MIXTURES
Edward R. Lady, Allentown, Pa., assignor, by mesne assignments, to Air Products and Chemicals, Inc., Trexlertown, Pa., a corporation of Delaware
Filed Sept. 26, 1960, Ser. No. 58,335
8 Claims. (Cl. 62—21)

The present invention relates to the separation of the components of gaseous mixtures, more particularly by low temperature liquefaction and fractionation. The invention has utility in connection with the separation of the components of a variety of gaseous mixtures, but is particularly useful and will be illustrated by way of example in connection with the separation of air into its principal components, oxygen and nitrogen.

It is an object of the present invention, in the separation of the components of gaseous mixtures by low temperature liquefaction and fractionation, to increase production of a lower boiling component in liquid phase.

Another object of the present invention, in the separation of the components of air by low temperature liquefaction and fractionation, is to increase the production of liquid nitrogen.

It is also an object of the present invention, in the separation of the components of gaseous mixtures, to produce a lower boiling component and a higher boiling component each in substantial purity, for example, simultaneously to produce pure nitrogen and pure oxygen in an air separation cycle.

Still another object of the present invention, in the separation of components of gaseous mixtures by low temperature liquefaction and fractionation, is the achievement of more efficient operation of expansion engines in connection with such mixtures contaminated with impurities, for example, air contaminated with carbon dioxide.

A further object of the invention, in a low temperature air separation cycle, is the avoidance of compressor explosion or fire hazards during start up.

The invention also contemplates, in a low temperature air separation cycle, avoiding explosion or fire hazards during reactivation of filter and adsorber equipment with gas containing appreciable amounts of oxygen.

Finally, the present invention has as an object, in the low temperature separation of components of gaseous mixtures, such as air, methods that will be efficient to practice at relatively low cost, and apparatus that will be relatively simple and inexpensive to manufacture, and safe and easy to operate, maintain and repair.

Other objects and advantages of the present invention will become apparent from a consideration of the following description, taken in connection with the accompanying drawings, in which:

FIGURE 2 is a view similar to FIGURE 1 but showing a modified cycle; and

FIGURE 3 is a view similar to FIGURES 1 and 2 but showing still another modified cycle.

Figure 1:
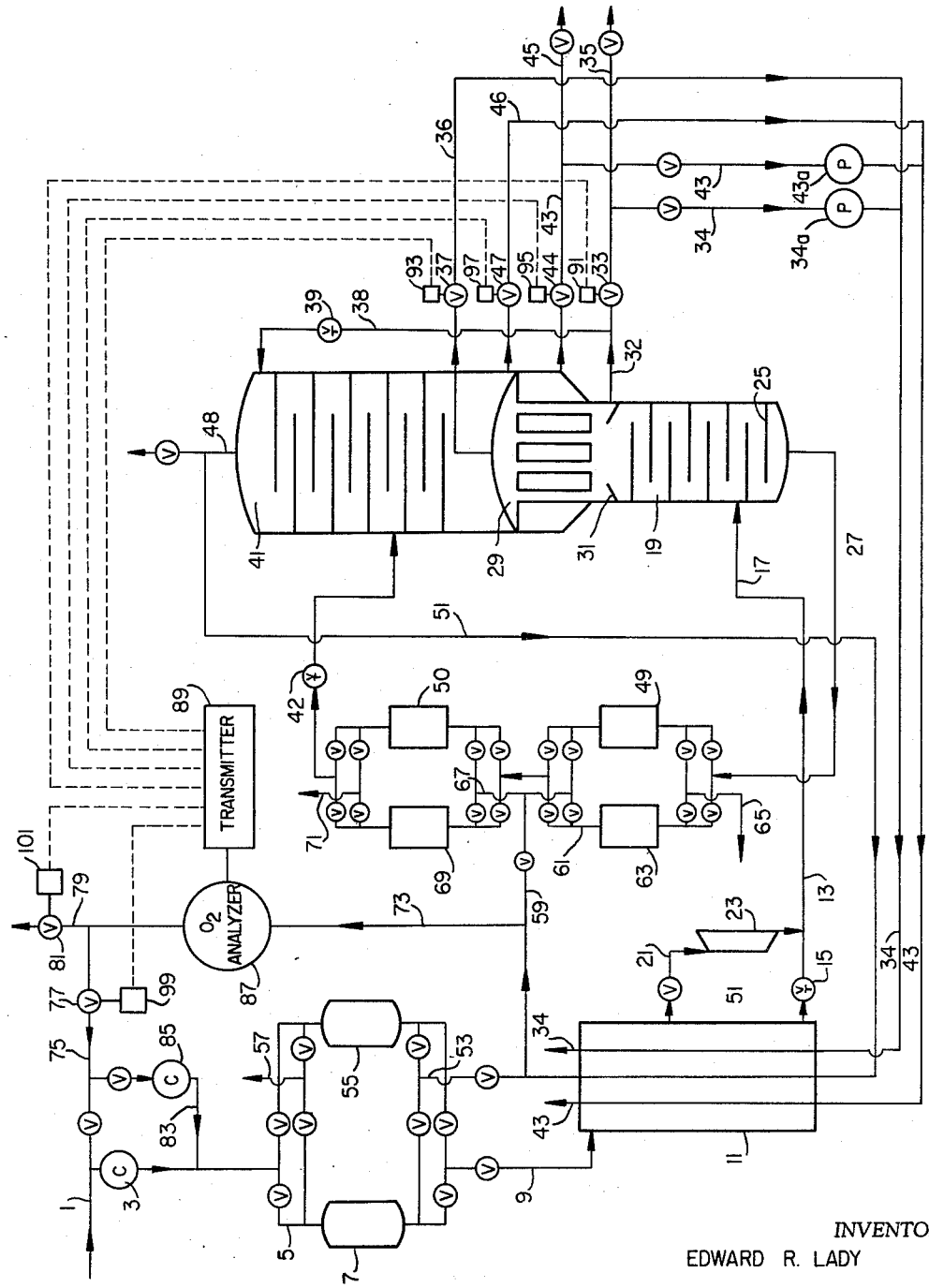
FIGURE 1 is a schematic diagram of a gaseous mixture separation cycle according to the present invention.

Very broadly, the basic invention comprises the discovery, in the art of separating gaseous mixtures by low temperature liquefaction and fractionation, that production of a lower boiling component in liquid phase may be increased, or lower boiling and higher boiling components may both be separated in substantial purity, by withdrawing from the separation lower boiling component and recycling this withdrawn material as a portion of the feed.

In the following more detailed description, in which several alternative separation cycles are described each of which embodies the present invention, the mixture being separated is recited as air. It is to be expressly understood, however, that the invention is not limited to air but is applicable to other gaseous mixtures as well.

Referring now to the drawings in greater detail, there is shown in FIGURE 1 a cycle in which air enters as feed through a conduit 1 and proceeds to a compressor 3 in which it is compressed to relatively high pressure. The compressed air then proceeds through a valve-controlled conduit 5 to a dryer 7 of a pair of switching driers in parallel. The compressed and dried air then proceeds through a valved conduit 9 to a heat exchanger 11. The air is cooled in exchanger 11 by heat exchange with returning separation products and proceeds from exchanger 11 through conduit 13 and through an expansion valve 15 through which it is expanded to a temperature and pressure within the air condensation range, although of course it may be expanded only to saturation conditions, in which latter case it would remain entirely in vapor phase, as in the case of gas plant operation. The expanded air, partly in liquid and partly in vapor phase, passes through a conduit 17 into high pressure stage 19 of a conventional two-stage air separation column. In order to provide additional refrigeration from the compression of the air, a side stream of air is withdrawn from exchanger 11 through valved conduit 21 and is expanded with the production of external work in an expansion turbine 23, whence it joins the other air feed stream in conduit 17 on its way to high pressure stage 19.

In high pressure stage 19, rectification takes place in the usual manner over a series of trays 25, to produce a liquid bottoms product that is withdrawn through conduit 27 and a vapor overhead that is condensed in a condenser-evaporator 29 and some is caught on a shelf 31 while the rest falls back to reflux stage 19. The liquid withdrawn through conduit 27 is richer in oxygen than is air, while the liquid on shelf 31 is substantially pure nitrogen. This latter liquid is withdrawn through conduit 32 and a portion proceeds past a control valve 33 whence it may pass through a conduit 34 and be pumped to relatively high pressure in a pump 34a and be evaporated in a separate pass of exchanger 11 to cool the incoming feed and then pass off as a gaseous nitrogen product of high purity, or the liquid nitrogen that has passed through valve 33 may be withdrawn as a substantially pure liquid nitrogen product through valved conduit 35, or both. The substantially pure nitrogen not condensed in condenser 29 may be withdrawn in vapor phase through conduit 36 past control valve 37 and into conduit 34 to be warmed in exchanger 11. The remainder of the liquid nitrogen passes from conduit 32 through branch conduit 38 past expansion valve 39 therein and into the top of low pressure stage 41 of the double column, where it serves as reflux.

The liquid in conduit 27 is passed through an expansion valve 42 and is introduced into low pressure stage 41 at its appropriate composition level, and this material is fractionated in low pressure stage 41 to produce a liquid oxygen product in substantial purity in the bottom of low pressure stage 41 surrounding condenser 29 and an overhead vapor which is primarily nitrogen. The liquid bottoms product, which is substantially pure oxygen, may be withdrawn through conduit 43 past control valve 44 and be pumped to relatively high pressure in a pump 43a and be vaporized in a separate pass of exchanger 11 while cooling the incoming feed, or it may be withdrawn as liquid oxygen product through a valved conduit 45, or both. Alternatively, the oxygen product may be withdrawn in vapor phase through a conduit 46 controlled by a valve 47, whence it enters conduit 43, or oxygen product may be withdrawn part in liquid and part in vapor phase. The overhead of stage 41 is withdrawn through a valved conduit 48.

Air contains carbon dioxide as an impurity. The carbon dioxide has a relatively high solidification temperature and tends to deposit out in solid phase during the cycle. This solid carbon dioxide would clog the equipment if it were not removed. The pressure of the feed gas in exchanger 11 is above the critical pressure of carbon dioxide, so that no carbon dioxide deposits in this exchanger. Therefore, the carbon dioxide passes through conduits 13 and 21 and through conduit 17 into low pressure stage 19, where it collects as solid particles in the liquid bottoms withdrawn through conduit 27 and is also present in saturated solution in the liquid crude oxygen. Accordingly, filter and adsorber equipment is provided in conduit 27 for removing the carbon dioxide upstream of low pressure stage 41. Specifically, the impure liquid oxygen is fed through a valved branch conduit to a carbon dioxide filter 49 which is one of a pair of such filters in parallel switching relationship, and thence to a valved branch conduit by which it is fed through a carbon dioxide adsorber 50 of a pair of switching adsorbers in parallel. The adsorbers may for example contain silica gel as the adsorbent. The filters remove the solid carbon dioxide, while the adsorbers remove the dissolved carbon dioxide plus any solid carbon dioxide that the filters may have missed. The liquid impure oxygen, substantially completely free from carbon dioxide, then proceeds to low pressure stage 41.

One principal feature of the present invention is the opportunity to withdraw unusually great quantities of liquid lower boiling component such as liquid nitrogen through valved conduit 32. The production of liquid at the top of the high pressure stage is achieved by boiling away the liquid at the bottom of the low pressure stage and the liquid nitrogen condensed in the interior of condenser 29 is directly proportional to the liquid oxygen boiled away on the outside of condenser 29. Therefore, it follows that upon an increase in liquid nitrogen product withdrawal through conduit 32, the oxygen product that can be withdrawn through conduit 43 or 46 will be reduced in quantity and that greater quantities of oxygen accordingly will leave through conduit 48.

Therefore, the overhead vapor leaving low pressure stage 41 may tend to be enriched in oxygen compared to what it would be with little or no liquid nitrogen withdrawal through conduit 35. With little or no withdrawal through conduit 35, the vapor through conduit 48 might be, say, 99.5% nitrogen.

Most of this overhead passes through conduit 51 to the other side of exchanger 11. The cold nitrogen gives up its refrigeration in the exchanger, and this refrigeration is picked up by incoming air. The nitrogen leaves the warm end of exchanger 11 not far from ambient temperature and pressure.

This warm nitrogen stream is free from both water vapor and carbon dioxide. Accordingly, portions of it are used to reactivate the driers and filters and adsorbers. Specifically, during the reactivation cycle of the driers, a portion of warm waste nitrogen is passed through a valved branch conduit 53 to the off-stream drier such as drier 55 of the pair of switching driers. Drier 55 is off-stream with regard to the air feed, and the warm dry nitrogen reactivates the off-stream drier and is vented through conduit 57.

Another stream of warm reactivation nitrogen passes through valved branch conduit 59 and is divided, and one portion passes through valved branch conduit 61 to the other carbon dioxide filter 63 in parallel with filter 49 to clean up that off-stream filter 63, and is then vented through conduit 65. The other portion of the reactivation nitrogen that is supplied through conduit 59 passes through valved branch conduit 67 to the other or off-stream adsorber 69 to remove the accumulated carbon dioxide, and is then vented through conduit 71. The balance of the warm nitrogen passes through a conduit 73 to a conduit 75 controlled by a valve 77, or to a conduit 79 controlled by valve 81, or both. Conduit 79 vents the nitrogen, while conduit 75 recycles it to conduit 1 through compressor 3 in admixture with feed air. The recycle nitrogen can also be passed through a valved bypass conduit 83 and be recompressed in a compressor 85 in parallel to compressor 3. The recompressed and recycled nitrogen then is dried, cooled and expanded in admixture with or in parallel to the feed air.

The percentage of recycled nitrogen in the feed will vary depending upon product requirements of the cycle and may, for example, comprise fifty percent of the feed. The combined feed, of about equal parts of air and recycle nitrogen, thus contains about 11–13% oxygen instead of the usual 21% of oxygen in air.

The enrichment of the feed as to its nitrogen content so that the nitrogen content is, say, 87–89% of the feed instead of the usual 79%, results in a number of distinct advantages. In the first place, enrichment of the feed in nitrogen facilitates the separation and withdrawal of substantial proportions of pure nitrogen product at the top of the high pressure stage.

In the second place, the recycle nitrogen is free from carbon dioxide, and when it is mixed with, say, equal parts of make-up air, the carbon dioxide of the resulting mixture is only about half that of air. This mixture with relatively little carbon dioxide can then be expanded with work in turbine 23 with reduced tendency to deposit solid carbon dioxide in the expander. As a result, the expander can be operated so as to have a lower outlet temperature, and this in turn enables an increase in the total liquid production of the cycle, particularly the production of liquid nitrogen.

In the third place, the increase of nitrogen in the feed assures that, all other factors being equal, the overhead withdrawn through conduits 48 and 51 will tend to be richer in nitrogen than would otherwise be the case when an abnormal quantity of nitrogen is withdrawn as product, that is, will have a desirably low oxygen content. Low oxygen content, say, below about 10%, is desirable in the overhead from the low pressure stage, for a portion of this overhead is used to reactivate the driers and filters and adsorbers since this overhead is free from water and carbon dioxide. The hydrocarbons that are always present in air tend to become adsorbed on the solid carbon dioxide that collects in the filters, and when a gas having more than about 10% oxygen is used to reactivate these filters, there is an explosion hazard because of the presence of the adsorbed hydrocarbons. Therefore, low oxygen content in the overhead from the low pressure stage makes it possible to use this overhead for clean-up and reactivation purposes.

In the fourth place, the recycle of overhead nitrogen that reduces the proportion of carbon dioxide in the feed mixture, also assures that the filters and adsorbers can stay on-stream for longer periods of time without reactivation. In fact, if the amount of carbon dioxide is cut in half as by recycling a quantity of nitrogen equal to the qantity of make-up air, then the on-stream time of the filters and adsorbers can be roughly doubled.

It is of great importance, however, to assure that the oxygen content of the withdrawn low pressure nitrogen does not rise to such levels as to present an explosion hazard either in the compressor or with adsorbed hydrocarbons. An oxygen content substantially above atmospheric is dangerous in the compressor, and during start up such high oxygen contents are often encountered in the low pressure overhead. Therefore, it is desirable to take precautions to assure against excess oxygen in the low pressure overhead, should any of the operating conditions of the cycle vary in such a way as to increase the oxygen in the overhead from the low pressure stage, and during start up. Specifically, automatic monitoring and control of the oxygen content of the low pressure overhead is provided by means of an oxygen analyzer 87 disposed in the stream of overhead from the low pressure stage. This analyzer continuously analyzes the oxygen content of the overhead and functions, upon sensing oxygen in excess of a predetermined permissible maximum, to actuate transmitter 89 which in turn actuates valve operators 91 or 93, 95 or 97, and 99 or 101, to operate valves 33 or 37, 44 or 47, and 77 and 81, to reduce or cut off nitrogen withdrawal through conduit 34 or 35 or 36, increase oxygen withdrawal through conduit 43 or 46, decrease or preferably cut off recycle through conduit 75, and increase the flow rate through conduit 79, respectively. Analyzer 87 may take the form of any of a number of types of commercially available equipment, for example as disclosed in Patent No. 2,883,857, April 28, 1959, or as shown in Patents Nos. 2,882,719, April 21, 1959, 2,943,028 and 2,943,036 of June 28, 1960, or 2,949,765 of August 23, 1960.

As indicated above, conditions may vary throughout the operation of the equipment so as to cause increases or decreases in the quantity of oxygen leaving in the overhead from the low pressure stage, and the automatic control at 87 serves to prevent the excess of oxygen from becoming worse to the point that it is an explosion hazard in the presence of adsorbed hydrocarbons. This control is also useful, however, during the start-up period. During the first period of the operation of the equipment, before sufficient liquid nitrogen is available adequately to reflux the low pressure stage, the overhead from the low pressure stage contains a substantially greater proportion of oxygen than does atmospheric air. This gas enriched in oxygen, if recycled through the compressor, would present an explosion hazard. Therefore, during the start-up, the automatic recycle shut-off prevents explosion hazard from excess oxygen in the compressor even before the driers or filters or adsorbers need to be switched for the first time.

As mentioned above, the oxygen concentration of the overhead from the low pressure stage should not exceed about 10% although this may vary within the entire range from normal oxygen concentrations up to about 10% according to operating conditions and according to the desired ratio of the oxygen and nitrogen products. It is undesirable, however, to let the oxygen content of the reactivation streams exceed about 10%, from a standpoint of hydrocarbon explosion hazard. In order to use a single analyzer for both hydrocarbon explosion hazard and compressor explosion hazard, the same value of 10% may be taken as the compressor hazard value, although it is obvious that the compressor may safely handle gases having oxygen contents substantially higher than 10%, e.g. air. Thus, valve 81 will not open upon start up until the oxygen content of what would otherwise be the recycle gas has dropped from greater than that of air to, say, 10%. These figures, however, are subject to variation.

It will be appreciated that recycle reduction or cut off protects the compressor independently of the filters and adsorbers. It is the reduction of liquid nitrogen withdrawal that reduces the oxygen content of the low pressure overhead and thus protects the filters and adsorbers. Of course, when less liquid nitrogen is withdrawn as product there will be a corresponding increase in product oxygen withdrawal. When liquid nitrogen withdrawal is reduced, regardless of whether the recycle is also cut off, the column approaches conventional air column operation in the sense that the composition of the low pressure overhead moves toward nitrogen purity and the quantity of oxygen product correspondingly increases.

The cycle of FIGURE 1 employs filters and adsorbers for removing carbon dioxide from the gaseous feed mixture at low temperature. However, the broad invention is by no means limited to cycles in which carbon dioxide is removed in this manner. For example, in FIGURE 2 is shown another embodiment of the invention in which the carbon dioxide is removed from the air before compression in a caustic scrubber 103 of conventional construction. Apart from the presence of the caustic scrubber, the cycle of FIGURE 2 is generally similar to that of FIGURE 1 except that the carbon dioxide filters and adsorbers, rendered unnecessary by the caustic scrubber, have been eliminated, and in their place a pair of switching hydrocarbon adsorbers 105 and 107 are provided, the conduit 59' for reactivation gas connecting selectively with whichever of these units is off-stream, through a valved conduit 109. The arrangement of FIGURE 2 is particularly well adapted to relatively low pressure cycles in which the feed passes through the main exchangers at a pressure below the critical pressure of carbon dioxide, so that carbon dioxide would otherwise tend to deposit in the on-stream exchanger in solid phase. One of the advantages of the nitrogen recycle in the embodiment of FIGURE 2 is that the consumption of caustic in the scrubber is thereby reduced in accordance with the reduced feed rate.

In the cycles described thus far, there has been no deposition of carbon dioxide in the main heat exchangers, either because it all passed through as in FIGURE 1 or was all taken out beforehand, as in FIGURE 2. However, the present invention is by no means limited to the main heat exchangers being free from carbon dioxide, and in FIGURE 3, there is shown a cycle similar to FIGURE 2 except for the method of carbon dioxide removal. In the cycle of FIGURE 3, the temperature and pressure levels of the main heat exchange between the feed and the products are such that carbon dioxide is removed from the feed by deposition in solid phase in a pair of switching exchangers 111 of conventional construction, adjacent the cold ends thereof when they are on-stream. Similarly, carbon dioxide removal is by sublimation in the stream of nitrogen overhead. The nitrogen leaving the warm end of the off-stream exchanger 111 thus carries off the carbon dioxide that entered in the air stream. This carbon dioxide cannot be recycled without progressive build-up of carbon dioxide in the cycle. Hence, it is removed by conventional means 113, which may comprise a caustic scrubber as shown, or parallel-connected adsorbers, located up-stream of the recycle point. Alternatively, of course, in cycles in which recycle nitrogen is not required to sublime carbon dioxide deposits, such as in cycles in which carbon dioxide contamination of gaseous products is not critical, the recycle nitrogen could be passed through separate heat exchange passageways.

It will therefore be appreciated that the invention in all of its embodiments is characterized by the opportunity to remove liquid lower boiling component in increased quantities, or by the opportunity to remove both components in substantial purity, simultaneously, or by both of these features. It will be recognized that both of features are unique when it is remembered that in a conventional cycle such as a conventional air cycle, the high pressure bottoms is crude oxygen and the high pressure overhead is substantially pure nitrogen, while in the low pressure stage the bottoms is substantially pure oxygen but the overhead is an impure nitrogen of, say, 99.5% purity.

It will also be appreciated that the presence of increased quantities of oxygen in the low pressure overhead, compared to conventional column operation, is a concomitant only of the higher rates of withdrawal of the lower boiling product. When high purity nitrogen, for example, is withdrawn from the top of the high pressure stage, whether in liquid or in vapor phase, the purity of the low pressure nitrogen overhead is not reduced so long as the high pressure product is withdrawn at a rate no greater than the rate of nitrogen recycle. It is when the withdrawn high pressure nitrogen exceeds this quantity that the purity of the low pressure overhead falls off and substantial quantities of oxygen begin to show up in the recycle stream. Moreover, the present invention provides an arrangement which assures safe operations, at start-up and during normal running conditions, when employing the novel concept of recycling gaseous product as a portion of the feed mixture. It will be appreciated that the feature of monitoring the oxygen content of the nitrogen stream employed for purging and reactivation of components of the cycle to prevent the danger of explosion due to the presence of excessive oxygen concentrations may be employed when the nitrogen recycle concept is not in operation or may be utilized in cycles not including such concept.

In view of the foregoing disclosure, it will be obvious that all of the initially recited objects of this invention have been achieved.

Although this invention has been described and illustrated in connection with preferred embodiments, it is to be understood that modifications and variations may be resorted to without departing from the spirit of the invention, as those skilled in this art will readily understand, such modifications and variations are considered to be within the purview and scope of the present invention as defined by the appended claims.

What is claimed is:

1. Apparatus for separating a mixture of normally gaseous components by low temperature liquefaction and fractionation in which a first component boils at a lower temperature than a second component, comprising means for compressing a mixture of the first and second components to a first pressure, means for expanding compressed mixture to cool it, fractionating means for separating from expanded mixture portions of the first and second components and for withdrawing separated portions of the first and second components as separation products with at least withdrawn first component in liquid phase, means for withdrawing during the separation first component in vapor phase, means for compressing first component thus withdrawn in vapor phase to substantially said first pressure, means for admixing said thus-compressed vapor phase first component to said mixture of first and second components before said mixture is expanded, means for expanding thus compressed vapor phase first component to cool it, and means for feeding to the fractionating means thus expanded first component in admixture with expanded mixture.

2. A method of separating a mixture of normally gaseous components by low temperature liquefaction and fractionation in which a first component boils at a lower temperature than a second component, comprising the steps of compressing a first gaseous mixture of the first and second components to a first pressure, expanding compressed first mixture to cool it, separating from expanded first mixture portions of the first and second components and withdrawing separated portions of the first and second components as separation products, withdrawing during the separation a second gaseous mixture of substantial proportions of each of the first and second components but richer in the first component than the first mixture, admixing thus-withdrawn second gaseous mixture to said first gaseous mixture prior to expanding said compressed first mixture, compressing the thus-withdrawn second mixture to substantially said first pressure, expanding admixture of said thus-withdrawn second mixture and said first mixture to cool same, and feeding the resultant cooled admixture to the separating step.

3. In apparatus for separating a mixture of normally gaseous components by low temperature liquefaction and fractionation in which a first component boils at a lower temperature than a second component, including means for separating and withdrawing as separation products portions of the first and second components; the improvement comprising means for withdrawing during the separation a second mixture of substantial proportions of each of the first and second components but richer in the first component than the first mixture, means for continuously automatically measuring the concentration of second component in the second mixture, and means for automatically reducing the rate of first component product withdrawal in response to a concentration of second component in the second mixture above a predetermined concentration level.

4. A method of separating a mixture of normally gaseous components by low temperature liquefaction and fractionation in which a first component boils at a lower temperature than a second component, comprising the steps of compressing a first mixture of the first and second components to a first pressure, expanding compressed first mixture to cool it, separating first component from expanded first mixture in a first fractionation zone at a second pressure lower than the first pressure, separating second component from material remaining from the first mixture in a second fractionation zone at a third pressure lower than the second pressure, withdrawing from the cycle separated portions of the first and second components as separation products with at least one withdrawn separated portion being substantially pure liquid phase first component which is not subjected to further rectification, withdrawing from the second fractionation zone a second mixture of substantial proportions of each of the first and second components but richer in the first component than the first mixture, compressing thus-withdrawn second mixture, expanding thus-compressed second mixture to cool it, and introducing thus-expanded second mixture into the first fractionation zone in admixture with expanded first mixture.

5. In apparatus for separating a mixture of normally gaseous components by low temperature liquefaction and fractionation in which a first component boils at a lower temperature than a second component, including means for separating and withdrawing as a separation product a portion of the first component from a first fractionation zone at a first pressure, and means for separating from material remaining in the mixture and withdrawing as a separation product a portion of the second component from a second fractionation zone at a second pressure lower than the first pressure; the improvement comprising means for withdrawing from the second fractionation zone a second mixture of substantial proportions of each of the first and second components but richer in the first component than the first mixture, means for continuously automatically measuring the concentration of second component in the second mixture, and means for automatically reducing the rate of first component product withdrawal in response to a concentration of second component in the second mixture above a predetermined concentration level.

6. Apparatus for separating a mixture of normally gaseous components by low temperature liquefaction and fractionation in which a first component boils at a lower temperature than a second component, comprising means for compressing a first mixture of the first and second components to a first pressure, means for expanding compressed first mixture to cool it, fractionating means for separating from expanded first mixture portions of the first and second components and for withdrawing separated portions of the first and second components as separation products, means for withdrawing during the separation a second mixture of substantial proportions of each of the first and second components but richer in the first component than the first mixture, means for compressing thus-withdrawn second mixture to substantially said first pressure, means for feeding thus-compressed second mixture in admixture with expanded first mixture to the fractionating means, means for continuously automatically measuring the concentration of second component in the second mixture, and means for automatically reducing the rate of feeding second mixture to the separation in admixture with expanded first mixture in response to a concentration of second component in the second mixture above a predetermined concentration level.

7. Apparatus for separating a mixture of normally gaseous components by low temperature liquefaction and fractionation in which a first component boils at a lower temperature than a second component, comprising means for compressing a first mixture of the first and second components to a first pressure, means for expanding compressed first mixture to cool it, means for separating first component from expanded first mixture in a first fractionation zone at a second pressure lower than the first pressure, means for separating second component from material remaining from the first mixture in a second fractionation zone at a third pressure lower than the second pressure, means for withdrawing from the cycle separated portions of the first and second components as separation products from the first and second fractionation zones, respectively, means for withdrawing from the second fractionation zone a second mixture of substantial proportions of each of the first and second components but richer in the first component than the first mixture, means for compressing thus-withdrawn second mixture, means for admixing said thus-withdrawn second mixture to said first mixture before said first mixture is expanded, means for expanding thus-compressed second mixture to cool it, means for introducing thus-expanded second mixture into the first fractionation zone in admixture with expanded first mixture, means for continuously automatically measuring the concentration of second component in the second mixture, and means for automatically reducing the rate of recycle of second mixture in response to a concentration of second component in the second mixture above a predetermined concentration level.

8. The method of claim 4 wherein said second mixture is admixed to the first mixture prior to expanding said compressed first mixture.

References Cited by the Examiner

UNITED STATES PATENTS

| | | | |
|---|---|---|---|
| 1,571,461 | 2/26 | Van Nuys | 62—30 |
| 1,745,730 | 2/30 | Uhde | 62—11 |
| 1,784,120 | 12/30 | Van Nuys | 62—26 |
| 2,213,338 | 9/40 | De Baufre | 62—21 |
| 2,409,458 | 10/46 | Van Nuys | 62—26 |
| 2,500,129 | 3/50 | Laverty | 62—26 |
| 2,502,282 | 3/50 | Schlitt | 62—30 |
| 2,525,660 | 10/50 | Fausek et al. | 62—37 |
| 2,600,133 | 6/52 | Simms. | |
| 2,785,544 | 3/57 | Levin | 62—37 X |
| 2,785,548 | 3/57 | Becker | 62—30 |
| 2,822,675 | 2/58 | Grenier | 62—47 X |
| 2,824,428 | 2/58 | Yendall | 62—29 X |
| 2,835,116 | 5/58 | Miller | 62—37 |
| 2,882,693 | 4/59 | Clay | 62—21 |
| 2,890,571 | 6/59 | Miller | 62—37 |
| 2,895,304 | 7/59 | Wicherer et al. | 62—29 X |
| 2,900,796 | 8/59 | Morrison | 62—11 |
| 2,932,174 | 4/60 | Schilling | 62—29 X |

FOREIGN PATENTS 786,296  11/57  Great Britain.

NORMAN YUDKOFF, *Primary Examiner.*

ROBERT A. O'LEARY, *Examiner.*